(12) United States Patent
Chen

(10) Patent No.: US 6,620,350 B2
(45) Date of Patent: Sep. 16, 2003

(54) METHOD FOR MAKING GRADIENT REFRACTIVE INDEX OPTICAL COMPONENTS

(75) Inventor: Guangji Chen, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 74 days.

(21) Appl. No.: 09/969,061

(22) Filed: Oct. 1, 2001

(65) Prior Publication Data

US 2003/0062636 A1 Apr. 3, 2003

(51) Int. Cl.⁷ ............................................... B29D 11/00
(52) U.S. Cl. ........................ 264/1.24; 65/405; 65/477; 65/479; 65/480; 264/2.7
(58) Field of Search ............................... 264/1.24, 1.28, 264/1.29, 2.7; 65/404, 405, 400, 433, 477, 479, 480

(56) References Cited

U.S. PATENT DOCUMENTS 4,784,679 A * 11/1988 Lentz
6,267,915 B1 * 7/2001 Park et al. ................. 264/1.24

* cited by examiner

Primary Examiner—Mathieu D. Vargot
(74) Attorney, Agent, or Firm—Wei Te Chung

(57) ABSTRACT

A method for making gradient refractive index optical components includes mixing a molten basic material (11) with a refractive index modifying material (21) in continuously changing proportions. The mixture is changed into a plurality of semi-molten fibers (41), and the fibers are rolled to form a continuous plate (51). The plate has a continuously changing refractive index along a lengthwise direction thereof. The plate is wound around a spindle (57) to obtain a wound preformed rod (58). The preformed rod is integrally fused by local heating, and drawn to form a draw (61) having a predetermined diameter. The draw is cut into pieces. Each piece can then be made into an optical component having a continuously changing refractive index in a radial direction. The method allows precise control of all steps, and such control is achieved with relative ease throughout.

10 Claims, 3 Drawing Sheets

METHOD FOR MAKING GRADIENT REFRACTIVE INDEX OPTICAL COMPONENTS

BACKGROUND OF THE INVENTION

1. Field of the Invention

The present invention relates to methods for manufacturing optical components having gradient refractive index distribution, particularly gradient refractive index (GRIN) lenses and GRIN optical fiber preforms.

2. Description of Related Art

Nowadays, the most popular gradient refractive index (GRIN) optical components include axial and radial GRIN lenses and GRIN optical fibers. Axial GRIN lenses are usually used to adjust spherical aberration and simplify optical systems. Radial GRIN lenses have more advantages than axial GRIN lenses. For example, many radial GRIN lenses are self-focused. Therefore such lenses are widely used in optical communications components such as circulators, couplers, switches, dense wavelength-division multiplexers (DWDMs) and light emitting diodes (LEDs). GRIN optical fibers are now widely used in long and short distance information transmission.

Gradient refractive index optical components such as GRIN lenses and optical fibers are presently manufactured by any of a variety of methods including ion exchange, Sol-Gel, bulk diffusion and chemical vapor deposition (CVD).

U.S. Pat. No. 4,902,330 discloses an ion exchange method. This is now the most popular method for producing gradient refractive index lenses. The method includes a first step in which a glass body is immersed into a molten salt. The molten salt contains ions which provide a refractive index higher than that of ions constituting the glass body. This results in ion diffusion into the glass body. In a second step, the glass body is then immersed into another molten salt. This other molten salt contains ions which provide a refractive index lower than that of the ions of the molten salt used in the first step. Thus a predetermined refractive index distribution in the glass body is obtained.

Although the ion exchange method is a comparatively simple and established technique for producing GRIN lenses, it still has several disadvantages. Some of these disadvantages are inherent in the ion exchange mechanism itself. The molten salt ions cannot travel very far into the glass rod to exchange with corresponding outgoing ions. Thus it is almost impossible to make large components, or components with a high refractive index gradient. In addition, products made by this method frequently do not have uniform quality. A proportion of poor quality products is relatively high, which results in high production costs.

U.S. Pat. No. 5,294,573 discloses a so-called Sol-Gel method for making glass gradient refractive index components. The process is initiated by forming a mixture of silicon alkoxide and an alcohol in a solution sufficiently acidic to partially hydrolyze the silicon alkoxide. An index modifying metal alkoxide, such as titanium and zirconium, is then added to the mixture. Water is then added to convert the metal alkoxide to a network of corresponding metal oxides suitable for gelation. The mixture containing the network of metal oxides is then maintained for a sufficient time to form a gel. The gel is acid leached until some of the index modifying metal oxides are removed. The gel is then fixed, to prevent further removal of index modifying metal oxides from the gel. The fixed gel is then rinsed with a solvent to remove precipitates from the gel, then dried, and finally sintered into a transparent gradient refractive index glass. In another version of this method, the fixing agent is acetone or a mixture of water and acetone. Generally this method employs a gel, which allows the metal salts used to modify the refractive index to travel easily. The gel is finally sintered to become a transparent glass rod. Thus the difficulties of ion dispersion of the ion exchange method are circumvented. However, other difficulties arise as a result. The sintered glass rod is often more brittle and less transparent than that of the ion exchange method. In addition, a processing cycle may be as long as 7 to 10 days.

Certain bulk diffusion methods are disclosed in U.S. Pats. Nos. 5,200,858, 5,236,468, 5,917,105 and 5,689,374. Layers of glass plates having different refractive indices and composition are stacked. Thus discontinuous gradient refractive index distribution can be attained. A highly controlled thermal treatment is used to blur the interfaces in the stack, and smooth the previously sharp gradient curve. Large-dimension components with selectable refractive index gradients can be attained using this method, and the initial refractive index distribution is easily controlled. Various kinds of optical glass and even optical polymer material can be used to produce GRIN lenses. Unfortunately, this method can only be used to manufacture axial GRIN lenses. The method cannot be used to manufacture the more popular radial GRIN lenses.

The CVD method includes the following main steps. Accompanying chemical reactions, chemical vapor with continuously changing composition is deposited on tube-shaped or plate-shaped substrates layer by layer. The substrates are then sintered to form a transparent glass rod that has a pre-determined refractive index distribution. This technique can be precisely controlled. However, it is not easy to perform, and requires a long production cycle.

In summary, the above-described methods have a variety of shortcomings. Some require lengthy and costly treatment using items such as special ovens and preparations of powders, liquids and gases. Others are unable to produce large components, or components that have a high refractive index gradient.

SUMMARY OF THE INVENTION

In view of the above, an object of the present invention is to provide a simple method for efficiently mass producing gradient rods and optical fiber preforms, and thereby minimize the cost of gradient refractive index components.

Another object of the present invention is to provide a method for producing radial gradient refractive index optical components of any desired dimension and having any desired refractive index gradient.

A further object of the present invention is to avoid the need for lengthy inter-diffusion, chemical or thermal treatments in the manufacture of gradient refractive index (GRIN) lenses or fiber preforms.

A still further object of the present invention is to provide means and a method for accurate control of gradient refractive index profiles in gradient refractive index optical components.

A method for making gradient refractive index optical components in accordance with the present invention includes mixing a molten basic material with a refractive index modifying material in continuously changing proportions. The mixture is changed into a plurality of semi-molten fibers, and the fibers are rolled to form a continuous plate.

The plate has a continuously changing refractive index along a lengthwise direction thereof. The plate is wound around a spindle to obtain a wound preformed rod. The preformed rod is locally heated to integrally fuse it, and drawn to form a draw having a predetermined diameter. The draw is cut into pieces. Each piece can then be made into an optical component having a continuously changing refractive index in a radial direction.

The method of the present invention allows precise control of all steps. In addition, the control is achieved with relative ease throughout. The method can be used for the manufacture of both radial and axial GRIN components. Furthermore, the method can be used for the manufacture of large sized optical components, and of optical components having a large refractive index distribution.

Other objects and advantages of the present invention will become apparent from the following description.

DESCRIPTION OF PREFERRED EMBODIMENT OF THE INVENTION

Figure 1:
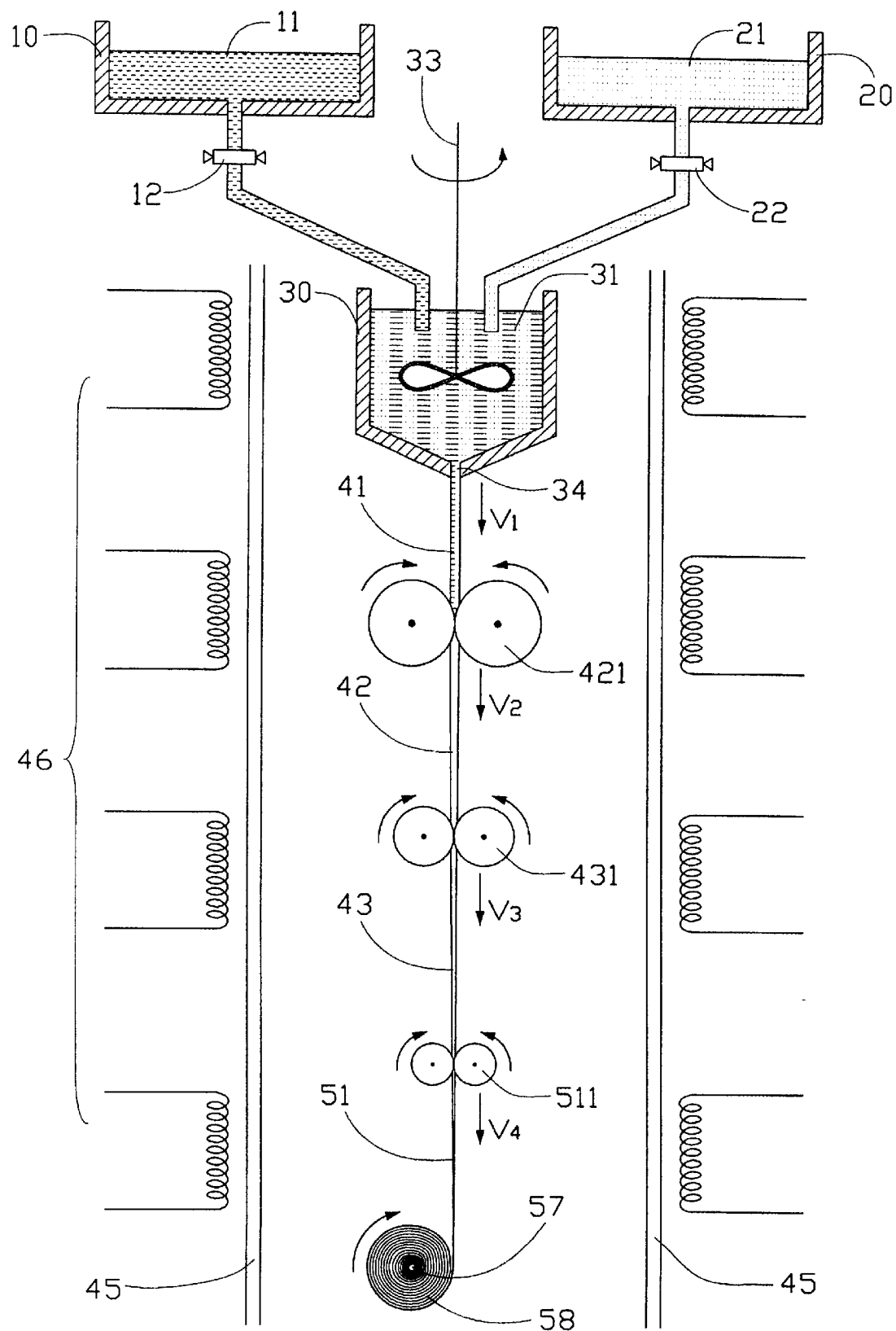
FIG. 1 is a schematic diagram of part of a method for manufacturing an optical component in accordance with the present invention.
Figure 2:
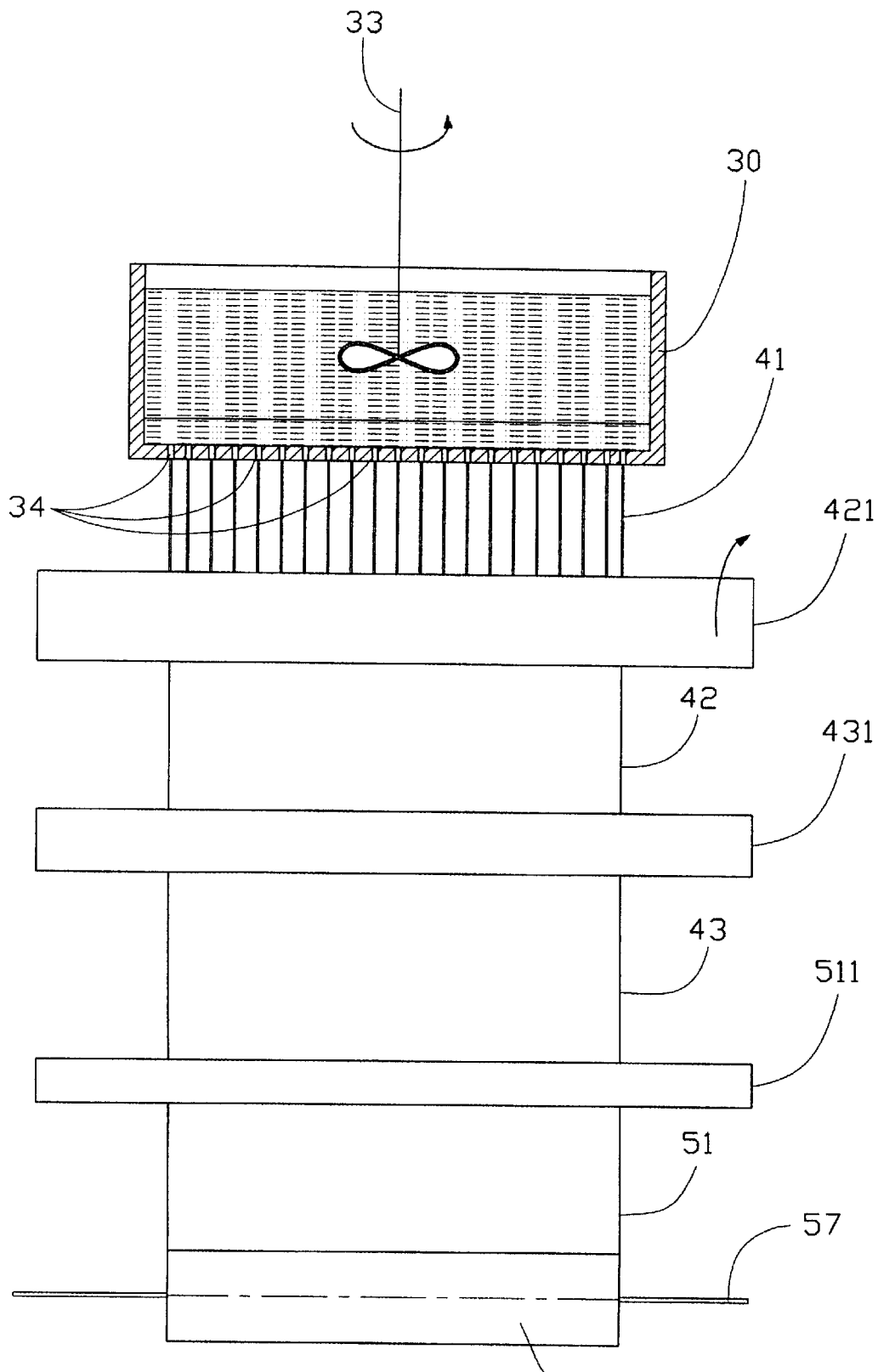
FIG. 2 is a schematic side view of a portion of FIG. 1.

FIGS. 1 and 2 depict a system for forming a gradient refractive index optical preformed rod in accordance with the present invention. A basic material 11 has a relatively low refractive index, and a refractive index modifying material 21 has a relatively high refractive index. In the preferred embodiment, the basic material 11 comprises glass. The basic material 11 may further or alternatively be comprised of polymer. The modifying material 21 itself comprises basic material 11 optimally, together with refractive index modifying ions selected from a group comprising Li, K, Na, Zn, Ti, Ba, Tl, Pb, La, Cs, Ag, Ta, and Zr.

The basic material 11 in a first crucible 10 and the modifying material 21 in a second crucible 20 are respectively heated and maintained at predetermined viscosities. The basic and modifying materials 11, 21 flow from the first and second crucibles 10, 20 into a third crucible 30 to form a mixture 31 therein. A mixer 33 rotates in the mixture 31 to agitate it and thereby keep it homogenous. A pair of flowmeters (not shown) in cooperation with a pair of valves 12, 22 respectively control flow rates of the basic and modifying materials 11, 21 flowing into the third crucible 30. Thus the valves 12, 22 respectively control proportions of the basic and modifying materials 11, 21 in the mixture 31. The proportions of the basic and modifying materials 11, 21 are continuously changed during the manufacturing process. Thus a composition of the mixture 31 in the third crucible 30 is continuously changed during the manufacturing process. In the preferred embodiment, the proportion of the basic material 11 is increased during the manufacturing process, while the proportion of the modifying material 21 is decreased.

A row of tiny holes 34 is defined in a bottom of the crucible 30. The mixture 31 in the third crucible 30 flows out of the crucible 30 through the holes 34. Three pairs of rollers 421, 431 and 511 are respectively arranged in sequence downstream of the third crucible 30. A plurality of heaters 46 and a pair of plate radiators 45 are arranged around the third crucible 30 and the rollers 421, 431 and 511. This ensures that the mixture 31, the semi-molten fibers 41, the plates 42, 43 and the film 51 are maintained at temperatures where their viscosities are properly controllable.

When the mixture 31 leaves the third crucible 30 via the holes 34, it becomes a plurality of semi-molten glass fibers 41 that are suitable for being shaped by the rollers 421. The rollers 421 press the fibers 41 to form a first plate 42 having a first thickness. Thereafter, the rollers 431 press the first plate 42 to form a second plate 43 having a second thickness. The second thickness is less than the first thickness. The first and second plates 41, 42 jointly and severally have a continuously changing refractive index along a lengthwise direction thereof. The rollers 511 press the second plate 43 to form a film 51 having a third thickness. The third thickness is less than the second thickness, and is predetermined for forming a preformed rod 58 of the present invention.

A spindle 57 provided after the rollers 511 rotates to collect the film 51. The spindle 57 thereby forms a plurality of wound layers of the film 51. The wound layers constitute the preformed rod 58.

Figure 3:
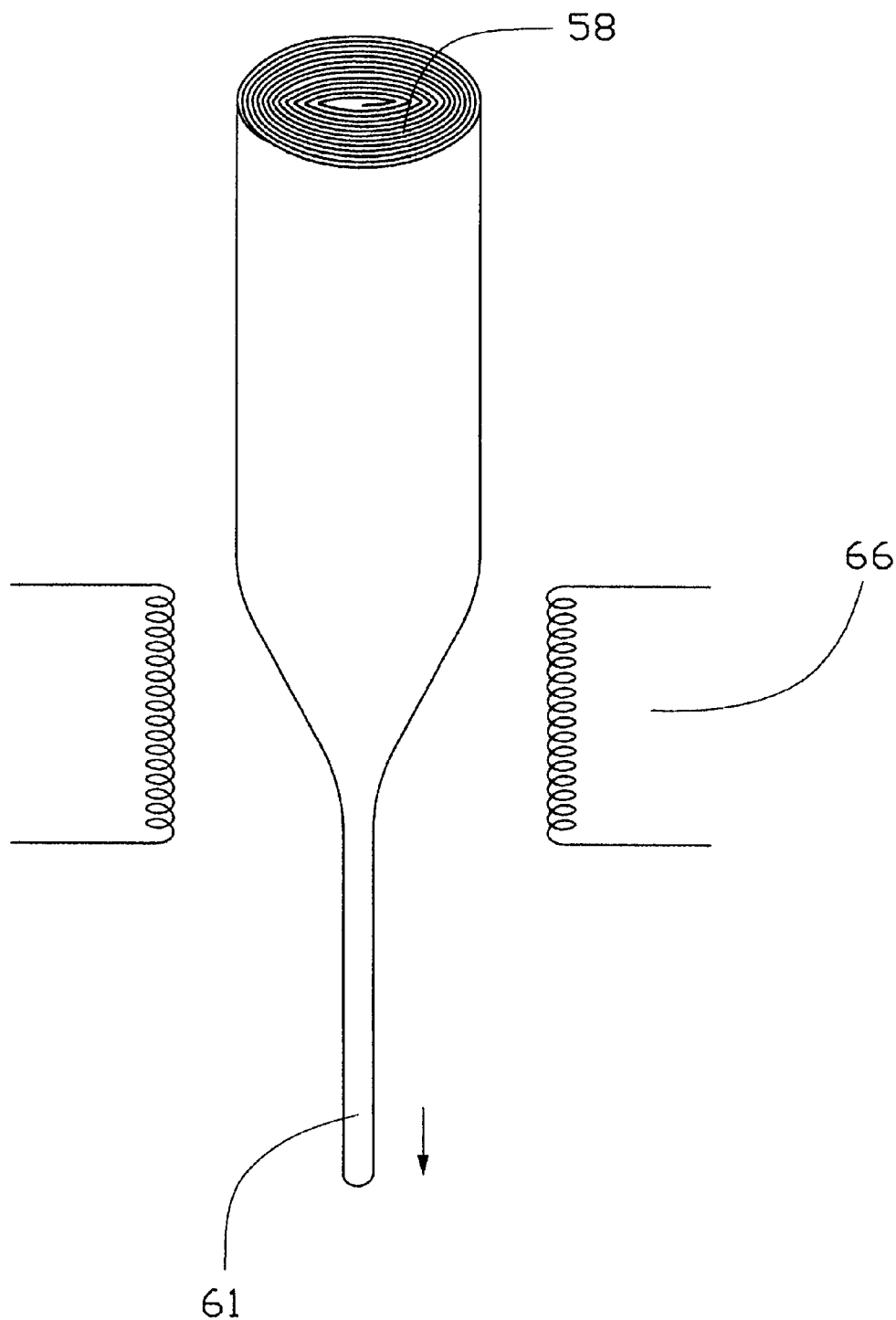
FIG. 3 is a schematic perspective view of a preformed rod obtained according to the part of the method illustrated in FIG. 1, and showing the rod being further processed into a draw.

FIG. 3 shows the preformed rod 58 being further processed into a draw 61. The preformed rod 58 is softened and integrally fused by local heating using heaters 66, and drawn to a form a draw 61 having a predetermined diameter. Thereafter, pieces are cut from the draw 61 to be made into optical components. Each such optical component has a continuously changing refractive index in a radial direction thereof.

In order to attain top quality products, a final thermal treatment before or after cutting of the draw 61 is strongly recommended.

All steps performed according to the method of the present invention are carried out in an uncontaminated environment.

In the present invention, thermal treatment of precursors of the preformed rod 58 results in the preformed rod 58 having uniform physical, chemical and optical composition. Yet such thermal treatment is completed in a relatively short time. The preformed rod 58 can then be expeditiously softened and drawn for making optical components.

The method of the present invention allows precise control of all steps, including steps that produce a continuously changing refractive index in the draw 61, the preformed rod 58, and precursors thereof. In addition, the control is achieved with relative ease throughout.

The method of the present invention can be used for the manufacture of both radial and axial GRIN components. In addition, the method of the present invention can be used for the manufacture of large sized optical components, and of optical components having a high refractive index gradient.

Other modifications and adaptations of the above-described preferred embodiment of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

I claim:

1. A method for making a gradient refractive index optical component, the method comprising the steps of:

(1) preparing a first crucible containing molten basic material therein and a second crucible containing refractive index modifying material therein, the basic material and the modifying material being heated and maintained at predetermined viscosities respectively;

(2) preparing a third crucible and guiding the basic material and the modifying material to the third crucible to form a mixture, wherein proportions of the basic material and the modifying material in the mixture are continuously changed;

(3) guiding the mixture to flow out of the third crucible as a plurality of semi-molten fibers;

(4) pressing the fibers to form at least one continuous plate, the at least one plate jointly and severally having a continuously changing refractive index along a lengthwise direction thereof;

(5) winding the plate about a core to obtain a wound preformed rod;

(6) heating the preformed rod to integrally fuse it, and drawing the integrally fused rod to form a draw having a predetermined diameter; and (7) cutting the draw into pieces, each piece having a predetermined length, whereby a plurality of optical components each having a continuously changing refractive index in a radial direction thereof can be obtained.

2. The method according to claim 1, wherein the basic material and the modifying material are each comprised of glass.

3. The method according to claim 1, wherein the basic material and modifying material are each comprised of polymer.

4. The method according to claim 1, wherein the modifying material itself comprises basic material combined with at least one refractive index modifying ion.

5. The method according to claim 4, wherein the at least one ion is selected from the group consisting of Li, K, Na, Zn, Ti, Ba, Tl, Pb, La, Cs, Ag, Ta, and Zr.

6. The method according to claim 1, wherein the proportions of the basic material and modifying material in the mixture are continuously changed by using a pair of flowmeters and a pair of valves, the flowmeters and valves controlling flow rates of the basic material from the first crucible to the third crucible and of the modifying material from the second crucible to the third crucible.

7. The method according to claim 1, wherein the pressing of the fibers to form the at least one plate is achieved by a plurality of pairs of rollers, each pair of rollers successively pressing the at least one plate to have a respective predetermined thickness.

8. The method according to claim 1, wherein all steps are performed in an uncontaminated environment.

9. A method of making a gradient refractive index optical component, comprising the steps of:

providing a continuous solid layer with a continuously variable refractive index along thereof a lengthwise direction which is parallel to a moving direction of said layer;

winding the layer around an axis to form a wound performed rod;

drawing the rod with a proper diameter thereof to form a draw; and cutting the draw into pieces with predetermined axial dimensions; wherein the lengthwise direction is essentially perpendicular to said axis, and each of said pieces defines a changing refractive index in a radial direction thereof.

10. The method according to claim 9, wherein said layer is made by the following steps:

providing liquid basic material;

providing liquid modifying material with a different refractive index from that of the basic material;

mixing the basic material and the modifying material to form a mixed material under a condition that the proportion of the modifying material of the mixed material is changed in a gradient manner; and guidably forming the mixed material to be said continuous layer.

* * * * *